United States Patent [19]
Goss et al.

[11] Patent Number: 6,089,189
[45] Date of Patent: Jul. 18, 2000

[54] SCOOPABLE CELLULOSIC ANIMAL LITTER

[76] Inventors: G. Robert Goss, 2426 Lind, Quincy, Ill. 62301; Robert Soral, 1744 Dewes St., Glenview, Ill. 60025

[21] Appl. No.: 09/037,316

[22] Filed: Mar. 9, 1998

[51] Int. Cl.$^7$ ..................................................... A01K 29/00
[52] U.S. Cl. .......................................................... 119/173
[58] Field of Search ................................... 119/171, 172, 119/173

[56] References Cited

U.S. PATENT DOCUMENTS

| | | | |
|---|---|---|---|
| 3,980,050 | 9/1976 | Neubauer | 119/1 |
| 4,203,388 | 5/1980 | Cortigene et al. | 119/1 |
| 4,341,180 | 7/1982 | Cortigene et al. | 119/1 |
| 4,374,794 | 2/1983 | Kok | 264/122 |
| 4,471,717 | 9/1984 | Lander | 119/171 |
| 4,517,919 | 5/1985 | Benjamin et al. | 119/173 |
| 4,532,890 | 8/1985 | Ohki et al. | 119/1 |
| 4,560,527 | 12/1985 | Harke et al. | 264/500 |
| 4,619,862 | 10/1986 | Sokolowski et al. | 428/221 |
| 4,621,011 | 11/1986 | Fleischer et al. | 428/221 |
| 4,638,763 | 1/1987 | Greenberg | 119/1 |
| 4,721,059 | 1/1988 | Lowe et al. | 119/1 |
| 4,930,443 | 6/1990 | Lowe et al. | 119/1 |
| 5,000,115 | 3/1991 | Hughes | 119/173 |
| 5,014,650 | 5/1991 | Sowle et al. | 119/171 |
| 5,101,771 | 4/1992 | Goss | 119/173 |
| 5,109,805 | 5/1992 | Baldry et al. | 119/173 |
| 5,129,365 | 7/1992 | Hughes | 119/173 |
| 5,152,250 | 10/1992 | Loeb | 119/171 |
| 5,229,348 | 7/1993 | Ivie | 502/401 |
| 5,359,961 | 11/1994 | Goss et al. | 119/173 |
| 5,503,111 | 4/1996 | Hughes | 119/173 |
| 5,542,374 | 8/1996 | Palmer, Jr. | 119/173 |
| 5,577,463 | 11/1996 | Elazier-Davis et al. | 119/173 |
| 5,593,542 | 1/1997 | Wolfer et al. | 192/4 |
| 5,622,600 | 4/1997 | Smith | 162/190 |
| 5,807,465 | 9/1998 | Knapic et al. | 119/172 |

FOREIGN PATENT DOCUMENTS

| | | |
|---|---|---|
| 787830 | 6/1968 | Canada . |
| 811654 | 4/1969 | Canada . |
| 0 378 421 | 7/1990 | European Pat. Off. . |
| 1513292 | 6/1978 | United Kingdom . |

*Primary Examiner*—Thomas Price
*Attorney, Agent, or Firm*—Olson & Hierl, Ltd.

[57] ABSTRACT

A cellulose-based, but clumpable animal litter product is disclosed. The litter product comprises a mixture of adhesive-bearing cellulosic granules and a particulate polymeric clumping agent. The normally protruding surface fibrils of the cellulosic granules are retained adjacent to the granule surface by the adhesive. The cellulosic granules can also be dedusted prior to treatment with the adhesive to enhance clumpability.

29 Claims, No Drawings

SCOOPABLE CELLULOSIC ANIMAL LITTER

FIELD OF THE INVENTION

This invention relates to a cellulosic animal litter combinations and methods for making such compositions.

BACKGROUND OF THE INVENTION

The use of processed, or granulated, cellulosic materials in animal litter is well known. For example, U.S. Pat. No. 4,374,794 to Kok illustrates a process for generating cellulosic cat litter pellets from fibrous waste sludge of the pulp and paper industries. U.S. Pat. No. 4,621,011 to Fleischer et al. also describes a process for making cellulosic granules and indicates their use in cat and other animal litter.

Given the relative abundance of suitable cellulosic source material, including waste paper, cellulosic granules could be a cost-effective alternative to clay granules. In commercial practice however, the use of cellulosic granules in conventional animal litter formulations has been limited because the cellulosic granules do not provide some of the consumer-demanded features provided by clay materials. In particular, conventional animal litters made up of substantial portions of cellulosic granules do not agglomerate or clump upon contact with aqueous liquids such as urine with or without conventional clumping agents.

As described in U.S. Pat. No. 5,101,771 to Goss, a clumping feature is highly desirable because it allows separation and removal of urine-soaked litter granules from an otherwise fresh bed of animal litter. Also referred to as scoopable litter because of a sieving scoop used to remove spent granules, such clumpable animal litter spares animal owners the expense and effort of full litter replacement.

Thus, there continues to be a need for a cellulosic animal litter that provides the urine clumping feature available from clay-based litters.

SUMMARY OF THE INVENTION

A clumpable, cellulose-based animal litter is obtained by applying a water-soluble adhesive to cellulosic granules having protruding fibrils and combining the resulting adhesive-bearing granules with a particulate polymeric clumping agent to form a substantially uniform admixture. The water-soluble adhesive is applied to the granules in an amount sufficient to substantially reduce the amount of fibrils projecting away from the granule surface.

The animal litter composition produced in the foregoing manner is free flowing but clumpable and comprises a mixture of a particulate, polymeric clumping agent and discrete cellulosic granules. The discrete cellulosic granules contain at least about 40 weight percent cellulose and have fibrils protruding from the granule surface but retained alongside the particle surface by a polymeric, water-soluble adhesive present on the granules in an amount up to about 6, preferably no more than about 2 weight percent, based on the weight of the granules. The cellulosic granules usually have a mean particle size in the range of about 0.25 to about 5 millimeters, but preferably have a mean particle size in the range of about 0.25 to about 1.5 millimeters. Detailed Description of the Preferred Embodiment While the present invention is susceptible to embodiments in many different forms, the preferred embodiment of the invention is described below. It should be understood, however, that the present disclosure is to be considered as an exemplification of the principles of the invention and is not intended to be limited the invention to the specific embodiments illustrated.

The animal litter composition of the present invention comprises a mixture of adhesive-bearing cellulosic granules and a particulate polymeric clumping agent. The adhesive-bearing cellulosic granules are formed by applying a polymeric, water-soluble adhesive to cellulosic granules that contain at least 40 weight percent cellulose and have fibrils protruding from the granule surface. The polymeric, water-soluble adhesive is distributed on the cellulosic granules in an amount sufficient to retain normally protruding cellulosic fibrils alongside, i.e. abutting, adjacent to, contiguous with, juxtaposed to, or next to, the granule surface.

To form an animal litter composition, the adhesive-bearing cellulosic granules are combined with clumping agent particles to produce a substantially uniform admixture that is free flowing when dry but clumping when wet. The water-soluble adhesive serves to substantially reduce the amount of fibrils projecting away from the granule surface and also enhances the effect of a clumping agent that is admixed with the adhesive-bearing cellulosic granules when the water-soluble adhesive is activated by wetting as the animal discharges body fluid.

The principal constituents of litter compositions that embody the present invention are relatively absorbent cellulosic granule admixed with a clumping agent. The term "granule," as used herein, refers to any particulate form of matter such as particles, chips, pellets, agglomerates, and the like. The preferred cellulosic granules of the present invention have a mean particle size in the range of about 0.25 to about 1.5 millimeters, and an especially preferred particle size range within about 16 by about 60 mesh, U.S. Sieve Series. For a tabulation of U.S. Sieve Series screen nomenclature, see *Perry's Chemical Engineering Handbook,* 6th Ed., McGraw-Hill, Inc., New York, N.Y. (1984), p. 21–15 (Table 21-6).

The phrase "cellulosic granule," as used herein, means a granule containing at least about 40 weight percent cellulose. The cellulosic granules preferably contain, in addition to cellulose, a mineral filler. Suitable mineral fillers include kaolin, titanium dioxide, calcium carbonate, sodium bicarbonate, and mixtures thereof. Synthetic polymers and the like can also be included as filler. Binders generally known in the art, such as glue and starch, can be added to modify the physical properties of the granules.

The moisture content of the cellulosic granules usually is in the range of about 2 to about 14 percent by weight.

Cellulosic granules suitable for the present purposes can be readily prepared using known processing expedients. In particular, numerous methods exist in the art for generating granules from effluent streams of paper making processes. Illustrative are the processes and the resulting granules described in U.S. Pat. No. 4,203,388 to Cortigene et al., U.S. Pat. No. 4,374,794 to Kok, U.S. Pat. No. 4,619,862 to Sokolowski et al. and U.S. Pat. No. 4,621,011 to Fleischer et al., U.S. Pat. No. 5,593,542 to Wolfer et al., and U.S. Pat. No. 5,622,600 to Smith et al. Other granulation processes for making cellulosic granules can also be used.

In addition to the traditional waste-paper and tree related sources for cellulosic granules, other materials useful in practicing the present invention include granules derived from various plant sources, such as grains, fruits, cotton, vegetables, nuts, trees, grasses, peat, and the like. Representative cellulosic material sources from fruits include citrus pulp (from lemons, oranges, grape-fruits, etc.), apple pulp, grape pulp, tomato pulp, and the like. Representative cellulosic material sources from cotton include degraded cotton, cotton burns, cottonseed hulls, and the like. Representative cellulosic material sources from vegetables include beet pulp, carrot pulp, and the like. Representative cellulosic material sources from nuts include peanut shells, walnut shells, pecan shells, almond shells, and the like. Representative cellulosic material sources from grasses include alfalfa, hay, straw, and the like.

Illustrative polymeric, water-soluble adhesives suitable for present purposes are wheat paste, rice paste, starch, mucilage, and water-soluble vinyl polymers such as polyvinyl acetate. The adhesive present on the cellulosic granules of the present invention is preferably a polysaccharide, and most preferably pregelatinized corn flour or wheat paste. Such materials are commercially available.

A suitable corn starch adhesive is available from Kraus Milling Co., Milwaukee, Wis., under the designation AMERIKOR 818, while suitable polyvinyl acetate is available from The Borden Co., New York, N.Y., under the trade designation "Elmer's Glue-All."

While the water-soluble adhesive may substantially coat the surface of the cellulosic granules, in a preferred embodiment, the water-soluble adhesive is present on the cellulosic granules only to a level sufficient to allow the litter compositions to form strong clumps when contacted with liquids. The required amount of adhesive necessarily varies according to its type as well as the amount of clumping agent present in the litter composition. The water-soluble adhesive can be present in an amount up to about 6 weight percent, preferably no more than about 2 weight percent, based on the weight of the cellulosic granules.

For embodiments where wheat paste serves as the adhesive, it is present in an amount preferably in the range of about 0.1 weight percent to about 0.5 weight percent, based on the weight of the cellulosic granules. Where a wheat paste or pregelatinized starch adhesive is present with a guar gum clumping agent, the preferred amount of particulate guar gum in the litter composition is in the range from about 1.5 weight percent to about 3 weight percent, based on the total weight of the cellulosic granules. In general, the weight ratio of clumping agent-to-adhesive is preferably in the range from about 5:1 to about 2:1, but can be as high as 10:1 and as low as 1:1. A respective weight ratio of about 2.5:1 is particularly preferred.

The clumping agent component of the animal litter composition can be organic or inorganic and is a particulate material, and preferably a polysaccharide gum. An especially preferred polysaccharide is a galactomannan gum such as guar gum or locust bean gum. Gums, and galactomannan gums in particular, are well-known materials. See for instance, *Industrial Gums: Polysaccharides & Their Derivatives*, Whistler R. L., BeMiller J. N. (eds.), 3rd Ed. Academic Press (1992) and Davidson, R. L., *Handbook of Water-Soluble Gums & Resins*, McGraw-Hill, Inc., N.Y. (1980).

A galactomannan gum is a carbohydrate polymer containing D-galactose and D-mannose units, or other derivatives of such a polymer. There is a relatively large number of galactomannans, which vary in composition depending on their origin. The galactomannan gum is characterized by a linear structure of β-D-mannopyranosyl units linked (1→4). Single membered α-D-mannopyranosyl units, linked (1→6) with the main chain, are present as side branches. Galactomannan gums include guar gum, which is the pulverized endosperm of the seed of either of two leguminous plants (*Cyamposis tetragonalobus* and *psoraloids*) and locust bean gum, which is found in the endosperm of the seeds of the carob tree (*Ceratonia siliqua*). Carob gum is also a galactomannan gum.

Xanthan gum is yet another example of a suitable polysaccharide.

Non-gum polysaccharides such as cellulose ether can also serve as a clumping agent for the present litter composition. The cellulose ether can be methylcellulose, carboxymethylcellulose, hydroxypropylmethylcellulose, mixtures thereof, and the like. Examples of cellulose ethers that may be used as the clumping agent are the cellulose ether products manufactured by the Dow Chemical Company of Midland, Mich., and commercially available under the designation METHOCEL.

The animal litter of the present invention may also include an inorganic clumping agent such as sodium bentonite, alone or in combination with an organic clumping agent. When sodium bentonite is included, the preferred form is a relatively fine particulate with a particle size in the range of about 200 to about 325 mesh, U.S. Sieve Series.

For the animal litter of the present invention, the specific particle size and loading level for the clumping agent necessarily varies according to the size and character of the cellulosic granules as well as the type of clumping agent. In general, the clumping agent particles are relatively smaller, i.e. finer, than the cellulosic granules. For specific embodiments employing a guar gum clumping agent and cellulosic granules having a mean particle size in the range from about 0.25 to about 1.5 millimeters, the mean particle size of the guar gum is preferably in the range of about 10 to about 100 microns.

Such a fine particulate guar gum is commercially available under the designation "POLYPRO F11 TF" from Polypro International Co., Minneapolis, Minn.

A process aspect of the present invention renders normally non-clumping cellulosic granules clumpable without resulting in a substantial reduction in absorptive capacity. The process comprises applying the polymeric, water-soluble adhesive to the cellulosic granules having protruding fibrils and then combining the resulting adhesive-bearing granules with a particulate-form polymeric clumping agent to form a substantially uniform admixture.

As described above, the untreated cellulosic granules normally have surface fibrils protruding away from the granule surface. It has been found that such fibrils interfere with the formation of relatively strong clumps. The water-soluble adhesive is applied to the granules in an amount sufficient to substantially reduce the number of these fibrils projecting away from the granule surface and thereby smooth the surface to produce adhesive-bearing granules that are more readily clumpable.

The adhesive is preferably applied to the cellulosic granules in an aqueous vehicle, either as a solution or as an emulsion, depending upon the type of adhesive. The adhesive concentration also may vary but is generally in the range of about 1 to about 40 weight percent adhesive. In some instances a $C_1$ to $C_4$ lower aliphatic alcohol may be added to the aqueous vehicle to enhance distribution of the adhesive onto the granules and also to facilitate drying.

Adhesive application can be achieved in a variety of ways. Illustrative methods of application include spraying or sprinkling that is followed by or concurrent with agitation. The preferred method of applying adhesive onto the granules includes spraying an adhesive solution or emulsion over a tumbling bed of cellulosic granules. Both batchwise and continuous processing modes are suitable for this purpose.

The adhesive-bearing granules are combined with the particulate, polymeric clumping agent using various procedures capable of providing a substantially uniform admixture of dry granules and particulates.

After adhesive application but before mixing with the clumping agent, the resulting adhesive-bearing granules may be dried as necessary to provide the desired consistency. The conventional methods for drying particulate solids are acceptable for this purpose. The optional sodium bentonite clumping agent is preferably added when the adhesive-bearing granules are still tacky, however, thereby creating adhesive-bearing granules that are at least particularly coated with the sodium bentonite.

Preferably, the cellulosic granules are dedusted before being treated with the adhesive. As used herein, the term "dedusted" means that the granules are substantially free from relatively fine, dust-sized particles. The various conventional dry methods for dust separation are acceptable for this purpose. For a discussion of conventional dust separation equipment and methods, see *Perry's Chemical Engineering Handbook*, 6th Ed., McGraw-Hill, Inc., New York, N.Y. (1984), pp. 20–81 to 20–89. A dedusting method that includes passing the cellulosic granules through a fluidized bed is presently favored. Such a fluidized bed type deduster of fluidized bed type is commercially available from Glatt Air Techniques, Inc., Ramsey, N.J., under the designation MODEL WS615. Another suitable continuous mode deduster is commercially available from the Kice Industries, Inc., Wichita, Kans., under the designation "MultiAspirator."

In practice, the dedusting step serves not only to remove undesirable fines but also to either remove or soften the surface fibrils of the cellulosic granules by attrition. The dedusting treatment further enhances the clumpability of the resulting cellulosic litter.

The present invention is useful as litter for household cats, but the scope of the invention is not so limited. The compositions of the present invention provide several key features beneficial for animal litters in general. One key feature is clumping. Specifically, litter compositions of the present invention are free flowing when substantially dry but form strong scoopable clumps when contacted with aqueous liquids such as water. The litter generally forms a clump of durable clump strength very quickly, i.e., within about 30 seconds to about one minute, of being wetted with an aqueous liquid, such as water or animal urine. The term "durable clump strength" as used herein means that such a so-formed wetted clump has a firmness of sufficient structural integrity and hardness to withstand mechanical separation from the unwetted litter for disposal substantially immediately, i.e., within about 30 seconds to about one minute of being wetted and retains such firmness for a period of at least 24 hours. Clump strength can be evaluated objectively or subjectively by any number of conventional methods known in the animal litter arts.

A second key feature is a reduced tendency to generated dust upon handling when compared with conventional clay-based as well as cellulose-based litters. The adhesive-bearing cellulosic granules are also relatively more durable when compared to untreated particles.

Furthermore, the clumpable animal litter and manufacturing process of the present invention are compatible with conventional animal litter supplemental additives such as fragrances and deodorizers. For example, the cellulosic granules can be combined with a bactericide before, after or during application of the water-soluble adhesive. The cellulosic granules can also be supplemented with conventional litter clays such as hormite, attapulgite and smectite clays, if desired.

The practice of the present invention is demonstrated in the following examples. These examples are meant to illustrate the invention rather than to limit its scope. Variations in the litter compositions which do not adversely affect clumpability and absorption will be evident to one skilled in the art, and are within the scope of this invention. For example, additional ingredients such as coloring agents, and the like may be included in the litter compositions as long as the resulting composition retains desirable properties, as described above.

EXAMPLE 1

LITTER COMPOSITION A—WHEAT PASTE ADHESIVE AND GUAR GUM CLUMPING AGENT

An embodiment of the present invention was prepared using cellulosic granules containing about 60 weight percent cellulose and a mineral filler and having a particle size distribution of 16×50 mesh (U.S. Sieve Series), a wheat paste, and a particulate guar gum having a mean particle size of about 20 microns.

The cellulosic granules were dedusted using a Kice MultiAspirator (Kice Industries, Inc., Wichita, Kans.) and then sprayed with wheat paste while agitated in a rotating drum. The wheat paste was applied in a 10 weight percent aqueous solution. The sprayed granules were then dried in a gravity oven. The guar gum particles were then mixed with the cellulosic granules. The obtained litter composition had the following composition:

TABLE 1

|  | wt. % | wt. %, granule basis |
| --- | --- | --- |
| cellulosic granules | 97.8 | 100 |
| wheat paste | 0.196 | 0.2 |
| guar gum | 1.96 | 2 |

Evaluation of the litter composition with an aliquot of aqueous liquid revealed that the litter readily forms clumps of durable clump strength in less than two minutes. Furthermore, the produced clumps maintained structural integrity for a time period in excess of 24 hours.

EXAMPLE 2

COMPOSITIONS B THROUGH D—GUAR GUM ADHESIVE WITH GUAR GUM CLUMPING AGENT

Litter Compositions B through D were prepared in batch mode by spraying cellulosic granules (about 60 wt %-cellulose) with a dilute mixture of 0.5 weight percent guar gum in water. Adhesive loading was varied as indicated in TABLE 2, below, which provides composition data for samples B through D.

TABLE 2

| wt. %/wt. % - granule basis | granules | (adhesive) guar gum | (clumping agent) guar gum |
| --- | --- | --- | --- |
| Composition B | 97/100 | 0.13/0.13 | 2.9/3.0 |
| Composition C | 97/100 | 0.08/0.08 | 2.9/3.0 |
| Composition D | 97/100 | 0.05/0.05 | 2.9/3.0 |

As the guar gum adhesive was applied, the cellulosic granules were agitated using an inclined rotary disk. The sprayed granules were dried at room temperature for about 16 hours before combining with the particulate guar gum clumping agent.

The litter compositions were evaluated for clump strength at 30 seconds, 1 hour, and 24 hours after liquid contact. Obtained clumps were assessed for strength on a scale from 1 to 5, with 1 indicating a clump that does not break following a one foot drop onto a hard surface, and 5 indicating a clump that falls apart readily. The results are presented in TABLE 7. Litter Compositions B through D were all free flowing but readily clumping upon contact with an aqueous liquid. The obtained clumps for each composition had a durable clump strength.

EXAMPLE 3

COMPOSITIONS E AND F—PVA ADHESIVE WITH GUAR GUM CLUMPING AGENT

Litter Compositions E and F were prepared using the procedures described in EXAMPLE 2 for Compositions B through D except that a polyvinyl acetate (PVA) adhesive was used. The polyvinyl acetate was applied by spraying 2 weight percent "Elmer's Glue-All" (The Borden Co., New York, N.Y.) in water onto the cellulosic granules. Litters with the compositions listed in TABLE 3, below, were generated.

TABLE 3

| wt. %/wt. % - granule basis | granules | (adhesive) PVA-Glue | (clumping agent) guar gum |
| --- | --- | --- | --- |
| Composition E | 97/100 | 0.19/0.2 | 2.9/3.0 |
| Composition F | 97/100 | 0.59/0.62 | 2.9/3.0 |

Clumpability and clump strength were evaluated as described in EXAMPLE 2. The results are presented in TABLE 7, below. Litter Compositions E and F both formed strong, durable clumps after contact with an aqueous liquid.

EXAMPLE 4

COMPOSITIONS G THROUGH I—CORN STARCH ADHESIVE WITH GUAR GUM CLUMPING AGENT

Litter Compositions G through I were prepared using the procedures described EXAMPLE 2 for Compositions B through D except that a corn starch adhesive was applied to the cellulosic granules. Specifically, Litter Compositions G through I were made from a pregelatinized corn starch sold under the designation Amerikor 818 by Kraus Milling Co., Milwaukee, Wis. The corn starch was sprayed in the form of a 0.5 weight percent solution for Compositions G and H, and a 1.5 weight percent solution for Composition I. TABLE 4, below, provides composition data for the completed litter mixtures.

TABLE 4

| wt. %/wt. % - granule basis | granules | (adhesive) corn starch | (clumping agent) guar gum |
| --- | --- | --- | --- |
| Composition G | 97/100 | 0.13/0.13 | 2.9/3.0 |
| Composition H | 97/100 | 0.08/0.08 | 2.9/3.0 |
| Composition I | 97/100 | 0.22/0.23 | 2.9/3.0 |

Clumpability and clump strength were evaluated as described in EXAMPLE 2. The results are presented in TABLE 7, below. Litter Compositions G through H all formed durable clumps after contact with an aqueous liquid.

EXAMPLE 5

COMPOSITION J—SUPPLEMENTAL INORGANIC CLUMPING AGENT

An embodiment of the present invention was prepared using both a polymeric clumping agent and an inorganic, sodium bentonite clumping agent. A batch of cellulosic granules having a particle size in the range from about 18 to about 60 mesh, U.S. Sieve Series, were first dedusted in a fluidized bed and then sprayed with a polyvinyl acetate (PVA) solution. Specifically, the granules were sprayed with an aqueous solution of 10 weight percent "Elmer's Glue-All" (The Borden Co., New York, N.Y.). To achieve an adhesive loading of about 6 weight percent, based on the weight of the cellulosic granules, the PVA solution was applied to the granules at a weight ratio of 3 parts PVA solution to 5 parts cellulosic granules.

While the PVA-bearing cellulosic granules were still tacky, particulate sodium bentonite (200×325 mesh, U.S. Sieve Series) was admixed into the batch. After the resulting mixture was dried, the particulate guar gum clump agent was then added. The obtained litter had the following composition:

TABLE 5

|  | wt. % | wt. %, granule basis |
| --- | --- | --- |
| cellulosic granules (as dry) | 67.6 | 100 |
| PVA Adhesive | 4.0 | 6 |
| guar gum | 1.4 | 2 |
| Sodium bentonite | 27.0 | 40 |

The clumpability and clump strength of Litter Composition J were assessed as described in Example 2. Litter Composition J quickly formed a strong, durable clump after contact with an aqueous liquid.

EXAMPLE 6

COMPARISON OF RELATIVE CLUMPING EFFECTIVENESS

To further assess the relative effectiveness of embodiments prepared according to the present invention, two comparative litter compositions having granules without adhesive were prepared and evaluated for clumpability and clump strength. For the first, unsprayed cellulosic granules were combined with the same type and amount of clumping agent. For the second, the cellulosic granules were sprayed with water, dried and then combined with clumping agent. Specific compositions are listed in TABLE 6, below.

TABLE 6

| wt. %/wt. % - granule basis | granules | (adhesive) | (clumping agent) guar gum |
| --- | --- | --- | --- |
| Untreated Granules | 97/100 | none | 2.9/3.0 |
| Water Treated Granules | 97/100 | none | 2.9/3.0 |

TABLE 7 includes the results of clump strength testing for the litter compositions made from the untreated and water treated granules, together with such data for Litter Compositions B through J. These data demonstrate the superior ability of the cellulose based litter compositions according to the present invention to form durable clumps.

TABLE 7

| Clump Strength | 30 Seconds | 1 Hour | 24 Hours |
| --- | --- | --- | --- |
| Composition B | 1.3 | 1.0 | 1.0 |
| Composition C | 1.7 | 1.0 | 1.0 |
| Composition D | 2.0 | 1.0 | 1.0 |

TABLE 7-continued

| Clump Strength | 30 Seconds | 1 Hour | 24 Hours |
| --- | --- | --- | --- |
| Composition E | 2.0 | 1.0 | 1.0 |
| Composition F | 1.7 | 1.0 | 1.0 |
| Composition G | 2.0 | 1.0 | 1.0 |
| Composition H | 1.7 | 1.0 | 1.0 |
| Composition I | 1.0 | 1.0 | 1.0 |
| Composition J | 1.0 | 1.0 | 1.0 |
| Untreated Granules | 2.3 | 2.0 | 2.0 |
| Water Treated Granules | 3.0 | 1.7 | 1.7 |

The foregoing specification is intended as illustrative and is not to be taken as limiting. Still other variations within the spirit and the scope of the invention are possible and will readily present themselves to those skilled in the art.

We claim:

1. A particulate, free flowing but clumpable animal litter composition which comprises a mixture of:
   discrete cellulosic granules having fibrils protruding from the granule surface, but retained alongside the granule surface by a polymeric, water-soluble adhesive, said adhesive being present on the granules in an amount up to about 6 weight percent, based on the weight of the granules; and
   a particulate polymeric clumping agent present in the composition in an amount up to about 5 weight percent, based on the weight of the cellulosic granules,
   said cellulosic granules containing at least about 40 percent by weight cellulose.

2. The animal litter composition of claim 1 wherein the cellulosic granules contain a mineral filler which is a member of the group consisting of kaolin, titanium dioxide, calcium carbonate, sodium bicarbonate, and mixtures thereof.

3. The animal litter composition of claim 1 wherein said cellulosic granules have a mean particle size in the range of about 0.25 to about 5 millimiters.

4. The animal litter composition of claim 1 wherein the moisture content of said cellulosic granules is in the range of about 2 to about 14 weight percent, based on the weight of the cellulosic granules.

5. The animal litter composition of claim 1 wherein the surface of said cellulosic granules is substantially coated with said adhesive.

6. The animal litter composition of claim 1 wherein said adhesive is present in an amount up to about 1 weight percent, based on the weight of the granules.

7. The animal litter composition of claim 1 wherein the clumping agent-to-adhesive weight ratio is in the range of about 10 to 1 to about 1 to 1.

8. The animal litter composition of claim 1 wherein said adhesive is a member of the group consisting of a polysaccharide gum, wheat paste, rice paste, starch, mucilage, a water-soluble vinyl polymer, and mixtures thereof.

9. The animal litter composition of claim 1 wherein said adhesive is a polysaccharide.

10. The animal litter composition of claim 1 wherein said adhesive is polyvinyl acetate.

11. The animal litter composition of claim 1 wherein said clumping agent is a polysaccharide gum.

12. The animal litter composition of claim 1 wherein said clumping agent is a galactomannan gum.

13. The animal litter composition of claim 1 wherein said clumping agent is gum selected from the group consisting of guar gum, locust bean gum, xanthan gum, ether derivatives thereof, and mixtures thereof.

14. The animal litter composition of claim 1 further including an inorganic clumping agent present in an amount up to about 50 weight percent, based on the weight of the cellulosic granules.

15. The animal litter composition of claim 14 wherein the inorganic clumping agent is sodium bentonite.

16. The animal litter composition of claim 1 further including discrete clay granules present in an amount up to about 50 weight percent, based on the weight of the cellulosic granules.

17. The animal litter composition of claim 16 wherein said clay is a hormite clay.

18. The animal litter composition of claim 16 wherein said clay is a mixture of attapulgite and smectite clays.

19. A process for the manufacture of clumping animal litter that comprises:
    applying to cellulosic granules having protruding fibrils a water-soluble adhesive in an amount sufficient to substantially reduce the amount of fibrils projecting away from the granule surface; and
    combining the resulting, adhesive-bearing granules with a particulate polymeric clumping agent to form a substantially uniform admixture.

20. The process of claim 19 wherein the cellulosic granules have a mean particle size in the range of about 0.25 to about 5.0 millimeters.

21. The process of claim 19 further comprising the step of dedusting said cellulosic granules before applying the water-soluble adhesive thereto.

22. The process of claim 19 wherein said water-soluble adhesive is a member of the group consisting of a polysaccharide gum, wheat paste, rice paste, starch, mucilage, a vinyl polymer, and mixtures thereof.

23. The process of claim 19 wherein the adhesive is applied to the granules in the form of an aqueous solution.

24. The process of claim 19 wherein the adhesive is applied to the granules in the form of an aqueous solution while the granules are agitated to provide adhesive-bearing granules.

25. The process of claim 24 wherein the adhesive-bearing granules are dried before combining with the clumping agent.

26. The process of claim 19 wherein said clumping agent is a polysaccharide gum.

27. A process for the manufacture of clumping animal litter that comprises:
    dedusting cellulosic granules to produce dedusted granules substantially free from solid granules smaller than about 100 microns;
    contacting the dusted granules with a water-soluble adhesive to produce adhesive-bearing granules;
    drying the adhesive-bearing granules to a free-flowing state; and
    combining the dried granules with a particulate polymeric clumping agent to form a substantially uniform admixture.

28. The process of claim 27 wherein the cellulosic granules contain no more than about 40 weight percent cellulose in combination with a mineral filler and the ratio by weight of said clumping agent to said coating adhesive is in the range of about 10 to 1 to about 1 to 1.

29. The process of claim 27 wherein the dedusting step includes treating passing the cellulosic granules through a fluidized bed.

* * * * *